US012511390B2

(12) United States Patent
Murphy et al.

(10) Patent No.: US 12,511,390 B2
(45) Date of Patent: Dec. 30, 2025

(54) AMALGAMATION PLATFORM PROVIDING CONCEALED DETECTION OF CODE-PASSING USING STEGANOGRAPHY

(71) Applicant: Bank of America Corporation, Charlotte, NC (US)

(72) Inventors: Timothy Scott Murphy, Charlotte, NC (US); George Albero, Charlotte, NC (US); Maharaj Mukherjee, Poughkeepsie, NY (US); Jinna Kim, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 275 days.

(21) Appl. No.: 18/375,845

(22) Filed: Oct. 2, 2023

(65) Prior Publication Data

US 2025/0111050 A1 Apr. 3, 2025

(51) Int. Cl.
*G06F 21/56* (2013.01)
*G06F 11/3668* (2025.01)

(52) U.S. Cl.
CPC ........ *G06F 21/566* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 8,533,851 B2 | 9/2013 | Ginter et al. | |
| 8,745,742 B1* | 6/2014 | Satish | G06F 7/00 380/232 |
| 11,295,029 B1 | 4/2022 | Greenblatt et al. | |
| 11,683,182 B2 | 6/2023 | Gray et al. | |
| 12,218,919 B2* | 2/2025 | Albero | H04L 63/1483 |
| 2013/0163808 A1 | 6/2013 | Clements et al. | |
| 2013/0318347 A1 | 11/2013 | Moffat | |
| 2014/0108803 A1* | 4/2014 | Probert | G06F 21/16 713/170 |
| 2015/0349966 A1 | 12/2015 | Dimitrakos et al. | |
| 2016/0110838 A1 | 4/2016 | Humphries | |
| 2016/0210445 A1 | 7/2016 | Deaver | |
| 2018/0007016 A1* | 1/2018 | Widergren | G06F 21/10 |
| 2018/0157824 A1 | 6/2018 | Daly et al. | |

(Continued)

*Primary Examiner* — Nicholas P Celani
(74) *Attorney, Agent, or Firm* — Banner & Witcoff, Ltd.

(57) ABSTRACT

Aspects related to an amalgamation platform providing concealed detection of code-passing using steganography are provided. An amalgamation platform may train a scoring engine to generate suspicion scores for code snippets and an amalgamation engine to generate execution scenarios for the code snippets. The platform may embed code in base code of a network using steganography. The platform may use the steganographic code to detect transmission of a code snippet. The platform may generate a suspicion score for the code snippet. The platform may update the scoring engine based on identifying the suspicion score satisfies a threshold. The platform may generate execution scenarios for the code snippet. The platform may determine a match between an execution scenario and a malicious code scenario. The platform may identify the code snippet as malicious and update the amalgamation engine based on the match. The platform may initiate security actions based on the match.

20 Claims, 9 Drawing Sheets

(56) References Cited

U.S. PATENT DOCUMENTS

| | | |
|---|---|---|
| 2018/0268116 A1 | 9/2018 | Deaver |
| 2018/0287806 A1 | 10/2018 | Carboni et al. |
| 2018/0351968 A1* | 12/2018 | Macleod ............... G06F 21/568 |
| 2018/0351969 A1 | 12/2018 | Macleod et al. |
| 2020/0228568 A1 | 7/2020 | Bursell |
| 2021/0089647 A1 | 3/2021 | Suwad et al. |
| 2021/0209606 A1 | 7/2021 | Herlands |
| 2021/0390450 A1 | 12/2021 | Slavov et al. |
| 2022/0057519 A1* | 2/2022 | Goldstein ............... G01S 17/88 |
| 2022/0232019 A1* | 7/2022 | Sinks .................. H04L 63/1416 |
| 2022/0239698 A1 | 7/2022 | Anantharaju |
| 2023/0229768 A1 | 7/2023 | Snyder |
| 2023/0230085 A1 | 7/2023 | Turgeman et al. |

\* cited by examiner

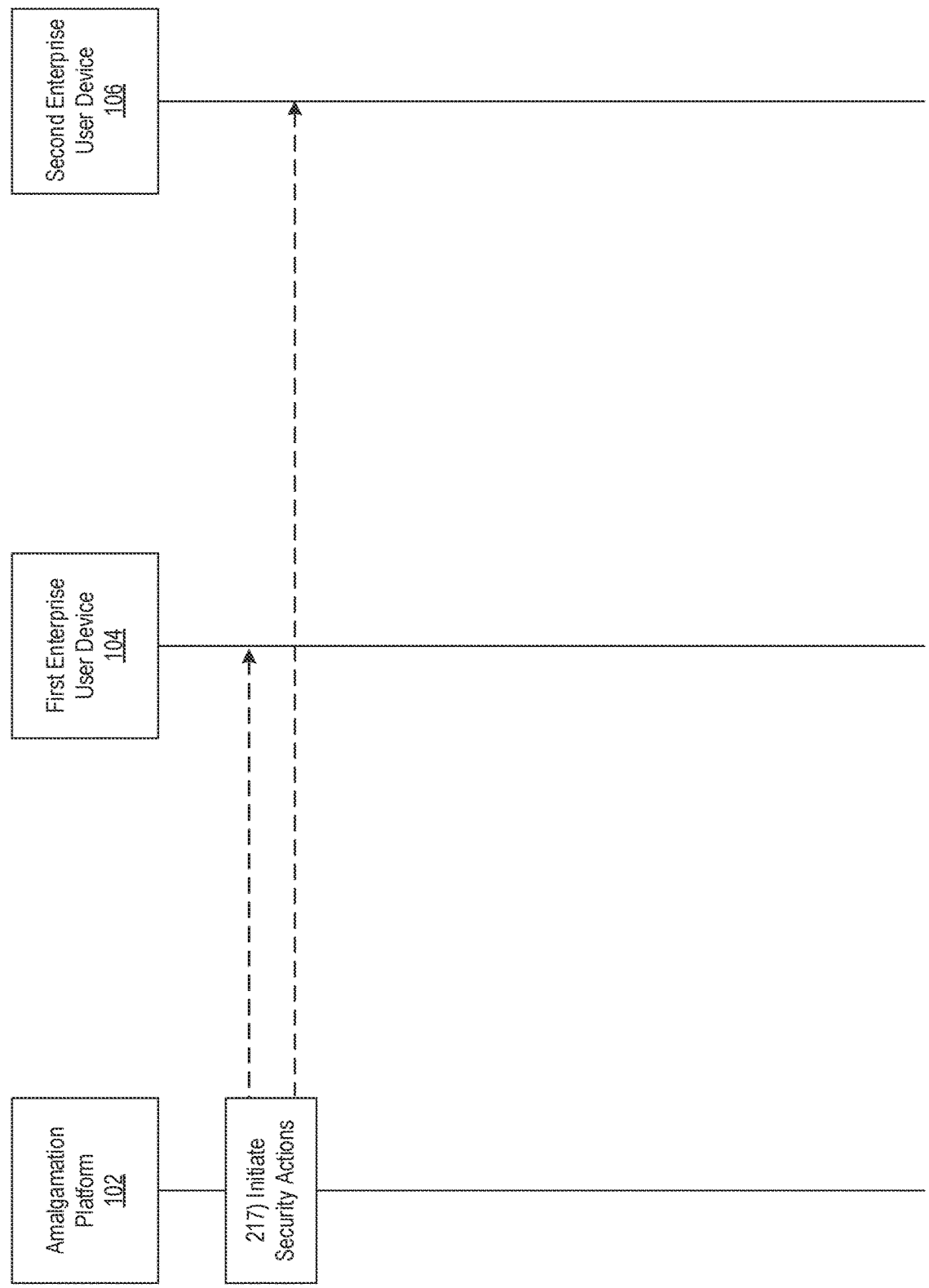

AMALGAMATION PLATFORM PROVIDING CONCEALED DETECTION OF CODE-PASSING USING STEGANOGRAPHY

BACKGROUND

Aspects described herein are related to an amalgamation platform providing concealed detection of code-passing using steganography. In some instances, entities such as an enterprise organization (e.g., a financial institution, and/or other institutions) may utilize a network of connected devices and/or applications to perform a variety of functions (e.g., process event processing requests, transfer information, and/or other functions). In some instances, malicious actors may attempt to gain access to confidential and/or proprietary code stored on and/or used by the network. For example, malicious actors may, via computer programs and/or human actors, receive snippets of code, transmitted to the malicious actors by one or more devices of the network. By passing (e.g., transmitting) snippets of code, the malicious actors may avoid conventional methods of detecting unauthorized transmission of code. Additionally or alternatively, the malicious actors may employ methods of detecting when snippets of code are being tracked by conventional cybersecurity methods and may, in response, circumvent the conventional cybersecurity methods. Accordingly, it may be important to provide a method for concealed detection of code-passing, allowing enterprise organizations to detect when code is passed/transmitted to malicious actors and initiate a response without alerting the malicious actors.

SUMMARY

Aspects of the disclosure provide effective, efficient, scalable, and convenient technical solutions that address and overcome the technical problems associated with current methods of detecting code-passing on a network. In accordance with one or more arrangements of the disclosure, a computing platform with at least one processor, a communication interface, and memory storing computer-readable instructions may train an amalgamation engine based on a training set of historical malicious code and historical execution scenarios. Training the amalgamation engine may configure the amalgamation engine to generate execution scenarios for code snippets based on input of the code snippets. The computing platform may embed steganographic code in base code of a network. The steganographic code may configure one or more portions of the base code to be tracked. The computing platform may detect a code snippet of the base code based on the steganographic doe. The code snippet may be included in transmissions via the network. The computing platform may generate a suspicion score for the code snippet. The suspicion score may correspond to an amount by which logic of the code snippet has been changed. The computing platform may determine whether the suspicion score satisfies a threshold score by comparing the suspicion score to the threshold score. The computing platform may generate one or more execution scenarios based on determining the suspicion score satisfies the threshold score and by inputting the code snippet into the amalgamation engine. Generating the one or more execution scenarios may include generating one or more test functions by combining the code snippet with a plurality of test code snippets. Generating the one or more execution scenarios may further include simulating by combining the code snippet with a plurality of test code snippets using the amalgamation engine. The computing platform may determine a match between a first execution scenario and a first malicious code scenario by comparing the one or more execution scenarios to one or more historical malicious code scenarios using the amalgamation engine. The computing platform may identify the code snippet as a malicious code snippet based on the match. The computing platform may update the amalgamation engine based on the malicious code snippet. The computing platform may initiate one or more security actions based on identifying the malicious code snippet.

In one or more arrangements, the computing platform may train a scoring engine based on a training set of historical code snippets and a training set of historical suspicion scores corresponding to the training set of historical code snippets. Training the scoring engine may configure the scoring engine to output, based on input of code snippets, suspicion scores. Generating the suspicion scores may include inputting the code snippet into the scoring engine. The computing platform may update the scoring engine based on determining the suspicion score satisfies the threshold score.

In one or more examples, the base code of the network may include source code of an application implemented by the network, code corresponding to a device linked to the network, and/or code embedded in data files transferred via the network. In one or more arrangements, the transmissions via the network may include transmissions from a device linked to the network and to one or more devices outside the network. In one or more examples, the steganographic code may be embedded in the code snippet.

In one or more arrangements, the steganographic code may be embedded in a first portion of the base code configured to monitor a second portion of the base code comprising the code snippet. In one or more examples, simulating execution of the one or more test functions may include simulating execution of the one or more test functions on the network via a digital twin of the network, modifying a clock of the amalgamation engine by a period of time while simulating execution of the one or more test functions on the network, and determining a result of executing the one or more test functions after the period of time expires based on modifying the clock of the amalgamation engine. In one or more arrangements, determining the match may be based on determining that the first execution scenario and the first malicious code scenario correspond to a same effect of executing code corresponding to each respective execution scenario.

In one or more examples, determining the match may be based on generating a similarity score for the first execution scenario using the amalgamation engine and based on the match. The similarity score may indicate a similarity between the first execution scenario and the first malicious code scenario. Determining the match may be based on comparing the similarity score to a second threshold score. Determining the match may be based on determining whether the similarity score satisfies the second threshold score based on comparing the similarity score to the second threshold score. In one or more arrangements, the one or more security actions may include causing display of an alert at a security device, generating a security report indicating the code snippet is malicious, blocking one or more transmissions of the code snippet, updating one or more security protocols of the network, and/or disconnecting, from the network, a user device that transmitted the code snippet.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for an amalgamation platform providing concealed detection of code-passing using steganography in accordance with one or more example arrangements;

DETAILED DESCRIPTION

Figure 1A:
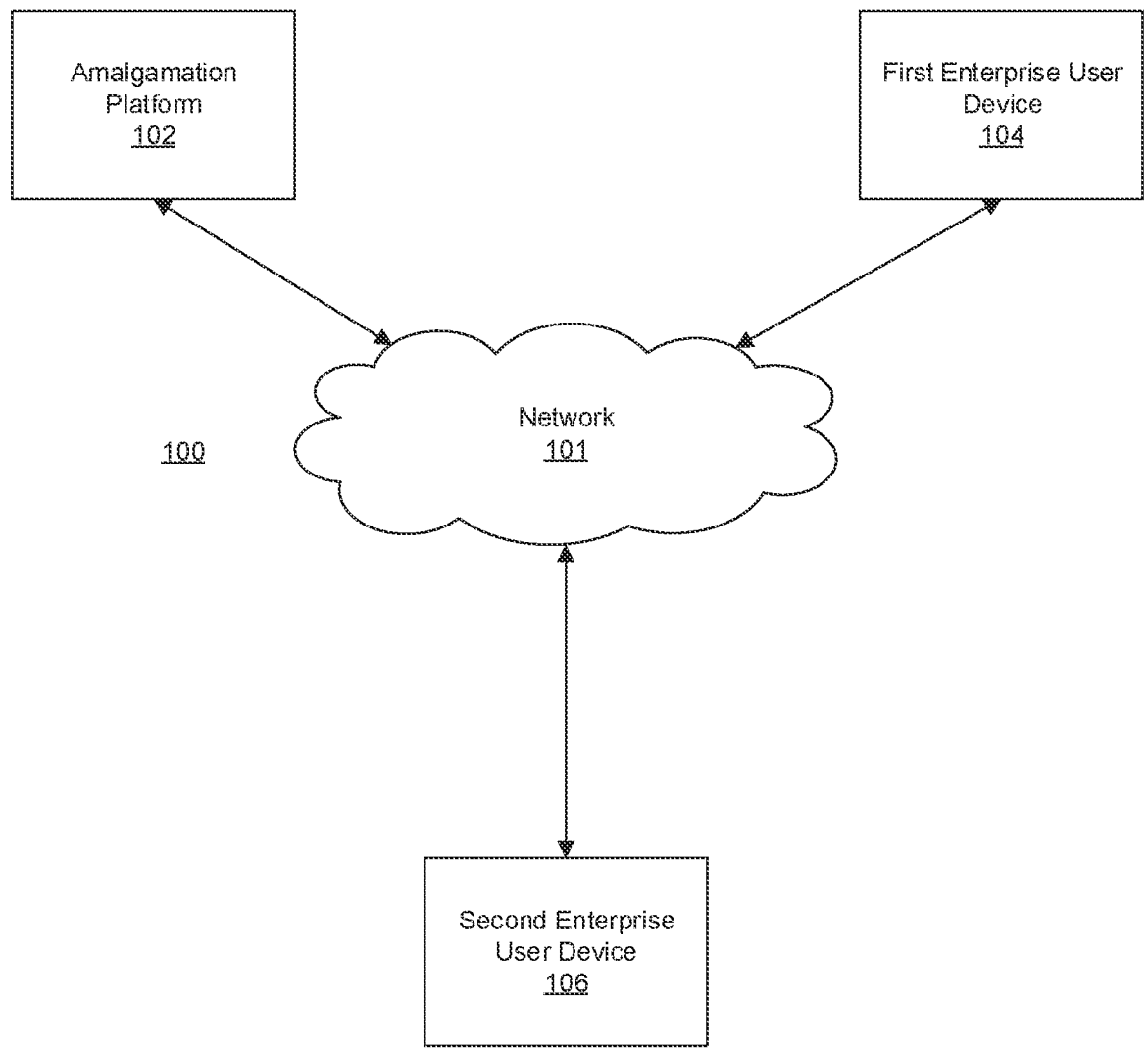
FIGS. 1A-1B depict an illustrative computing environment for an amalgamation platform providing concealed detection of code-passing using steganography in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to an amalgamation platform providing concealed detection of code-passing using steganography. In some instances, entities such as an enterprise organization (e.g., a financial institution, and/or other institutions) may utilize a network of connected devices and/or applications to perform a variety of functions (e.g., process event processing requests, transfer information, and/or other functions). In some instances, malicious actors may attempt to gain access to confidential and/or proprietary code stored on and/or used by the network. For example, malicious actors may, via computer programs and/or human actors, receive snippets of code, transmitted to the malicious actors by one or more devices of the network. By passing (e.g., transmitting) snippets of code, the malicious actors may avoid conventional methods of detecting unauthorized transmission of code. Additionally or alternatively, the malicious actors may employ methods of detecting when snippets of code are being tracked by conventional cybersecurity methods and may, in response, circumvent the conventional cybersecurity methods. Thus, there exists a need for providing a means by which code-passing can be detected by enterprise organizations without being detected by the malicious actors.

Accordingly, in some instances, entities such as an enterprise organization and/or other organizations/institutions may employ an amalgamation platform, as described herein. An amalgamation platform may embed code in base code of the network (e.g., in code of one or more applications used by the network, in code of one or more devices linked to the network, and/or other code corresponding to the network). In embedding code, the amalgamation platform may embed code that configures portions of the base code to be tracked if the portions are transmitted by devices linked to the network. The embedded code may be concealed from potential malicious actors. For example, the code may be embedded using steganography, concealing the code that configures base code to be tracked in one or more portions of the base code itself.

Based on embedding the code (e.g., "steganographic code") using methods such as steganography, the amalgamation platform may perform methods described herein to determine whether code snippets of the base code are being transmitted via the network and subsequently determine whether the code snippets are malicious code snippets (e.g., snippets that can alone or in combination with other code snippets cause malicious functions to be performed on and/or by devices or applications of the network). For example, the amalgamation platform may detect a code snippet included in transmissions via the network and generate a suspicion score for the code snippet. The suspicion score may indicate an amount by which logic of the code snippet has been changed. For example, the suspicion score may indicate a percentage by which the code snippet has been modified from the original base code. If the suspicion score satisfies a certain threshold, the amalgamation platform may generate scenarios representing simulations of executing the code snippet, alone or in combination with other code snippets. Based on the scenarios (e.g., based on comparing the scenarios to known malicious code scenarios) the amalgamation platform may determine whether the code snippet corresponds to indicators of maliciousness (i.e., whether the code snippet's logic has been modified to use the code for malicious purposes, whether the code snippet alone or in combination with other code snippets will have a negative effect on the network when executed, and/or other indications of maliciousness). If the amalgamation platform identifies the code snippet as malicious, the amalgamation platform may be used to initiate one or more security actions configured to address the malicious code snippet.

In some examples, in performing the methods of deploying and/or utilizing the amalgamation platform as described herein, the amalgamation platform may train one or more machine learning models. For example, the amalgamation platform may train a scoring engine based on historical code snippets and historical suspicion scores. The amalgamation platform may use the scoring engine to generate suspicion scores for code snippets. Additionally or alternatively, in some instances, the amalgamation platform may train an amalgamation engine based on known malicious code. The amalgamation platform may use the amalgamation engine to generate scenarios simulating execution of the code snippet and to identify matches between the scenarios and known malicious code scenarios.

These and various other aspects will be discussed more fully herein.

Figure 1B:
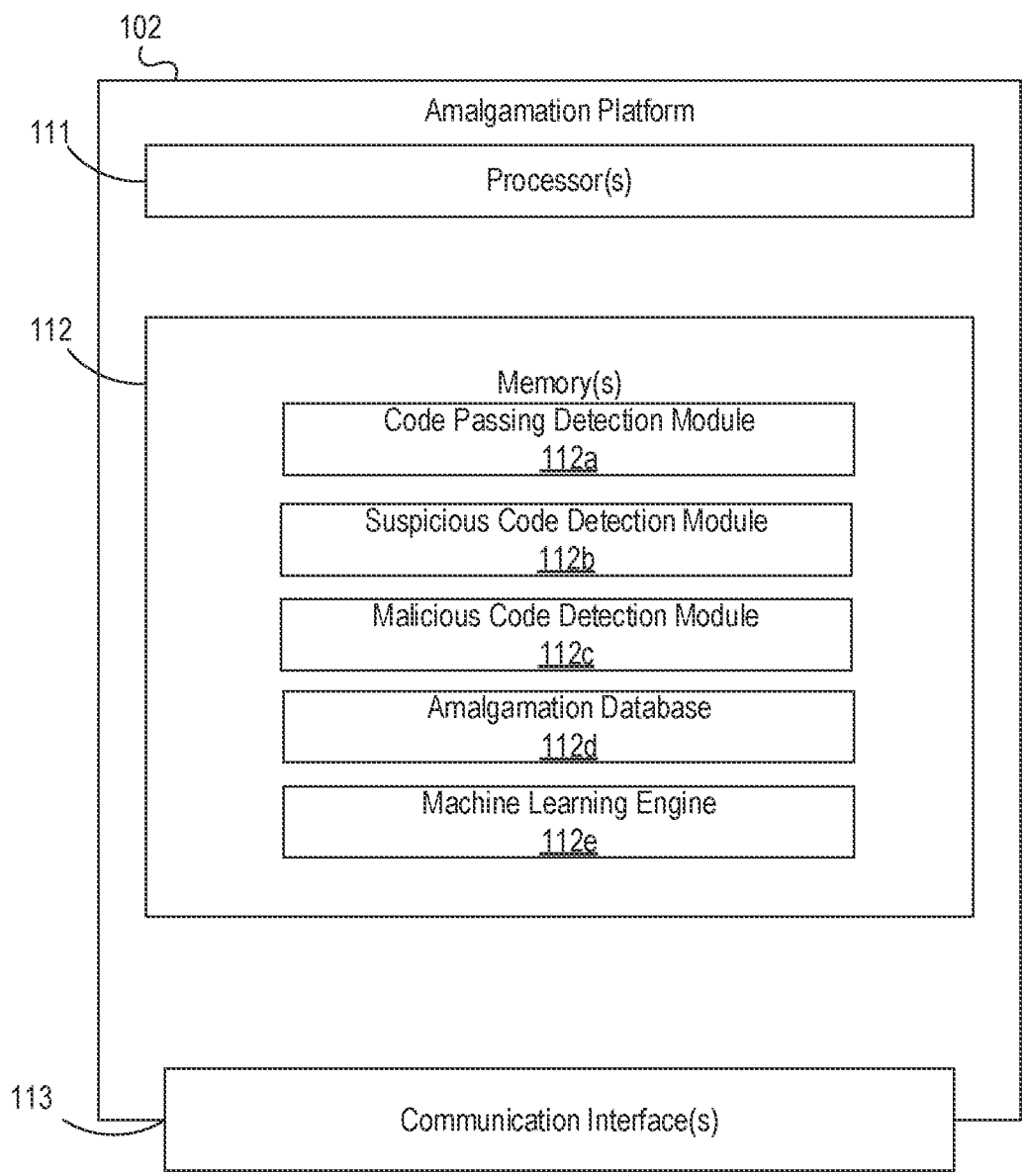

FIGS. 1A-1B depict an illustrative computing environment for an amalgamation platform providing concealed detection of code-passing using steganography in accordance with one or more example arrangements. Referring to FIG. 1A, computing environment 100 may include one or more computer systems. For example, computing environment 100 may include an amalgamation platform 102, a first enterprise user device 104, and a second enterprise user device 106.

As described further below, amalgamation platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train, and/or execute one or more machine learning models (e.g., scoring engines, amalgamation engines, and/or other models). For example, the amalgamation platform 102 may train a scoring engine to generate suspicion scores based on input of code snippets. Additionally or alternatively, the amalgamation platform 102 may train an amalgamation engine to generate scenarios (e.g., scenarios simulating execution of code snippets on network 101) based on input of code snippets. In some instances, the scoring engine and the amalgamation engine may be the same engine. The amalgamation platform 102 may be managed by and/or otherwise associated with an enterprise organization (e.g., a financial institution, and/or other institutions) that may, e.g., be associated with one or more additional systems (e.g., first enterprise user device 104, second enterprise user device 106, and/or other systems). In one or more instances, the amalgamation platform 102 may be configured to communicate with one or more systems (e.g., first enterprise user device 104, second enterprise user device 106, and/or other systems) to perform an information transfer, display an interface, initiate a security action, and/or perform other functions.

The first enterprise user device 104 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other user functions (e.g., transmit code snippets, and/or other functions). In one or more instances, first enterprise user device 104 may correspond to an entity (e.g., an enterprise organization, such as a financial institution and/or other institution). For example, the first enterprise user device 104 may correspond to the same entity associated with the amalgamation platform 102. In one or more instances, the first enterprise user device 104 may be configured to communicate with one or more systems (e.g., amalgamation platform 102, and/or other systems) to initiate a security action, and/or to perform other functions.

The second enterprise user device 106 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other user functions (e.g., receiving notifications of identified source iterations of a machine learning model, displaying an interface, and/or other functions). For example, the second enterprise user device 106 may be a computing device similar to first enterprise user device 104. In one or more instances, second enterprise user device 106 may correspond to an entity (e.g., an enterprise organization, such as a financial institution and/or other institution). For example, the second enterprise user device 106 may correspond to the same entity associated with the amalgamation platform 102. In one or more instances, the second enterprise user device 106 may be configured to communicate with one or more systems (e.g., amalgamation platform 102, and/or other systems) to receive a notification, display an interface, and/or to perform other functions. In some instances, the second enterprise user device 106 may be configured to display one or more graphical user interfaces (e.g., actionable alert interfaces, and/or other interfaces).

Although two user/enterprise devices are depicted herein, any number of such devices may be used to implement the methods described herein without departing from the scope of the disclosure.

Computing environment 100 also may include one or more networks, which may interconnect amalgamation platform 102, first enterprise user device 104, and second enterprise user device 106. For example, computing environment 100 may include a network 101 (which may interconnect, e.g., amalgamation platform 102, first enterprise user device 104, and second enterprise user device 106).

In one or more arrangements, amalgamation platform 102, first enterprise user device 104, and second enterprise user device 106 may be any type of computing device capable of sending and/or receiving requests and processing the requests accordingly. For example, amalgamation platform 102, first enterprise user device 104, second enterprise user device 106, and/or the other systems included in computing environment 100 may, in some instances, be and/or include server computers, desktop computers, laptop computers, tablet computers, or the like that may include one or more processors, memories, communication interfaces, storage devices, and/or other components. As noted above, and as illustrated in greater detail below, any and/or all of amalgamation platform 102, first enterprise user device 104, and second enterprise user device 106, may, in some instances, be special-purpose computing devices configured to perform specific functions.

Referring to FIG. 1B, amalgamation platform 102 may include one or more processors 111, memory 112, and communication interface 113. A data bus may interconnect processor 111, memory 112, and communication interface 113. Communication interface 113 may be a network interface configured to support communication between amalgamation platform 102 and one or more networks (e.g., network 101, or the like). Communication interface 113 may be communicatively coupled to the processor 111. Memory 112 may include one or more program modules having instructions that, when executed by processor 111, cause amalgamation platform 102 to perform one or more functions described herein and/or one or more databases (e.g., an amalgamation database 112*d*, or the like) that may store and/or otherwise maintain information which may be used by such program modules and/or processor 111. In some instances, the one or more program modules and/or databases may be stored by and/or maintained in different memory units of amalgamation platform 102 and/or by different computing devices that may form and/or otherwise make up amalgamation platform 102. For example, memory 112 may have, host, store, and/or include a code-passing detection module 112*a*, a suspicious code detection module 112*b*, a malicious code detection module 112*c*, an amalgamation database 112*d*, a machine learning engine 112*e*, and/or other modules and/or databases.

Code-passing detection module 112*a* may have instructions that direct and/or cause amalgamation platform 102 to communicate with the network 101, embed code in base code of the network 101, detect code snippets included in transmissions via the network 101, and/or perform other functions. Suspicious code detection module 112*b* may have instructions that direct and/or cause amalgamation platform 102 to generate a suspicion score for a code snippet, determine whether the suspicion score satisfies a threshold score, and/or perform other functions. Malicious code detection module 112c may have instructions that direct and/or cause amalgamation platform 102 to generate scenarios (e.g., scenarios simulating execution of the code snippets, and/or other scenarios), determine matches between scenarios and malicious code scenarios, identify malicious code snippets, initiate security actions, and/or perform other functions. Amalgamation database 112d may have instructions causing amalgamation platform 102 to store code snippets, malicious code, scenarios, and/or other information. Machine learning engine 112e may have instructions to train, implement, and/or update one or more machine learning models, such as a scoring engine, an amalgamation engine, and/or other machine learning models.

Although code-passing detection module 112a, suspicious code detection module 112b, malicious code detection module 112c, amalgamation database 112d, and machine learning engine 112e are depicted as separate modules herein, the instructions stored by these modules may be stored in any number of modules without departing from the scope of this disclosure.

Figure 2A:
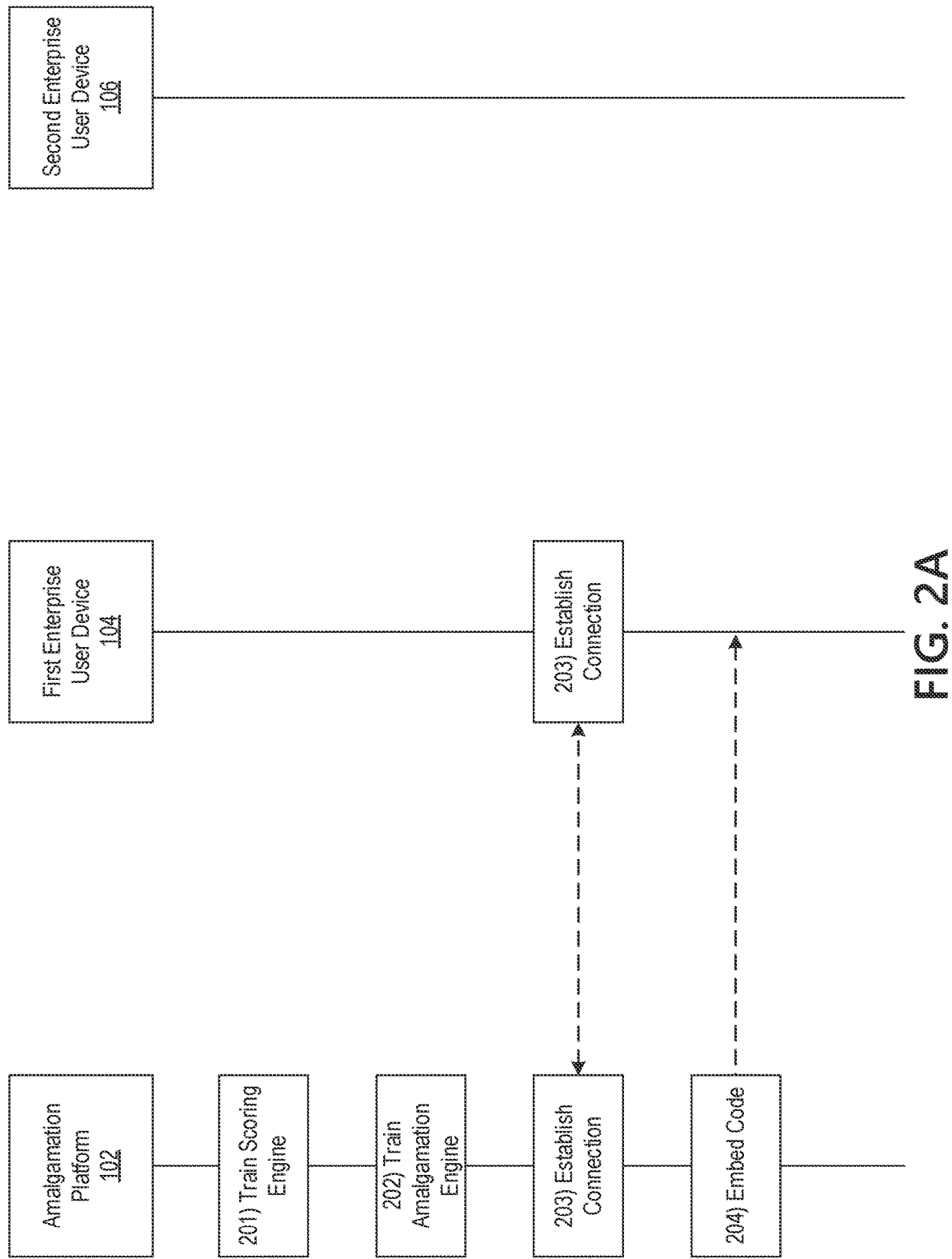

FIGS. 2A-2D depict an illustrative event sequence for an amalgamation platform providing concealed detection of code-passing using steganography in accordance with one or more example arrangements. Referring to FIG. 2A, at step 201, the amalgamation platform 102 may train a scoring engine. For example, the amalgamation platform 102 may train a scoring engine to generate suspicion scores for code snippets based on input of code snippets. In some instances, the amalgamation platform 102 may configure and/or otherwise train the scoring engine based on training data, such as a training set of historical suspicion scores and corresponding historical code snippets. For example, the amalgamation platform 102 may supply a training set of historical suspicion scores and corresponding historical code snippets based on historical code-passing detection operations the scoring engine is configured to emulate and/or replicate. Accordingly, the amalgamation platform 102 may train the scoring engine to output similar results to the training set based on receiving similar inputs. In some instances, to configure and/or otherwise train the scoring engine, the amalgamation platform 102 may process the training set of historical suspicion scores and corresponding historical code snippets by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques.

For example, in configuring and/or otherwise training the scoring engine, the amalgamation platform 102 may identify one or more features in historical code snippets that are indicative of and/or reflected in the corresponding historical suspicion scores. For instance, a historical code snippet may be associated with a particular device (e.g., first enterprise user device 104, and/or other devices included in network 101). For example, the historical code snippet may have been transmitted by the particular device, may have been included in code stored on the particular device, and/or otherwise have been associated with the particular device. In these instances, the amalgamation platform 102 may identify that a plurality of additional historical code snippets is associated with the same device. Accordingly, the amalgamation platform 102 may train the scoring engine to generate suspicion scores based on the historical suspicion scores corresponding to the plurality of historical code snippets when the scoring engine receives input of code snippets associated with the same device. For example, the amalgamation platform 102 may cause the scoring engine to store a correlation between the particular device, the historical code snippets, and the historical suspicion scores.

Additionally or alternatively, in some examples, the amalgamation platform 102 may configure and/or otherwise train the scoring engine to generate the suspicion scores based on comparing code snippets to the historical code snippets and corresponding historical suspicion scores. In some instances, the amalgamation platform 102 may identify a correlation between a feature of a historical code snippet and a corresponding historical suspicion score. For example, the amalgamation platform 102 may identify that a feature (e.g., a signature, a particular function associated with the historical code snippet, a source of the historical code snippet, or the like) of the historical code snippet corresponds to a particular likelihood of suspicion. For instance, in an example scenario, the amalgamation platform 102 may mine the historical code snippet to identify that the source of the historical code snippet indicated a 30% chance the historical code snippet was suspicious (e.g., potentially malicious). In such a scenario, the amalgamation platform 102 may identify and/or store a correlation between the source of the historical code snippet and a corresponding historical suspicion score of, e.g., 30%. Accordingly, the amalgamation platform 102 may train the scoring engine to generate a suspicion score of at least 30% for code snippets associated with the same source. It should be noted that the above are merely a few example methods by which the amalgamation platform 102 may train the scoring engine and that the amalgamation platform 102 may additionally and/or alternatively configure and/or otherwise train the scoring engine based on additional parameters and/or training information without departing from the scope of this disclosure.

At step 202, the amalgamation platform 102 may train an amalgamation engine. For example, the amalgamation platform 102 may train an amalgamation engine to generate execution scenarios for code snippets based on input of code snippets. In some instances, the amalgamation platform 102 may configure and/or otherwise train the amalgamation engine based on training data, such as a training set of historical malicious code and historical execution scenarios (e.g., scenarios simulating execution of historical code snippets, and/or other scenarios). For example, the amalgamation platform 102 may supply a training set of historical malicious code and historical execution scenarios based on historical code-passing detection operations the scoring engine is configured to emulate and/or replicate. Accordingly, the amalgamation platform 102 may train the amalgamation engine to output execution scenarios similar to the historical execution scenarios based on receiving code snippets to those used to generate the historical execution scenarios. Additionally or alternatively, the amalgamation platform 102 may train the amalgamation engine to determine malicious code snippets based on similarities between execution scenarios generated by the amalgamation engine and historical malicious code execution scenarios. In some instances, to configure and/or otherwise train the amalgamation engine, the amalgamation platform 102 may process the training set of historical execution scenarios and historical malicious code by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques.

In some instances, in configuring and/or otherwise training the amalgamation engine, the amalgamation platform 102 may identify one or more features of the historical execution scenarios associated with particular code snippets. For example, the amalgamation platform 102 may identify that particular effects of a historical execution scenario (e.g., activating an application on a network (e.g., network 101, or the like), installing an application on the network, granting a device access to the network, preventing a device from accessing the network, accessing information on the network, and/or other effects of executing code snippets) correspond to particular historical code snippets used to generate the historical execution scenario. Accordingly, the amalgamation platform 102 may train the amalgamation engine to generate execution scenarios similar to the historical execution scenario based on input of code snippets similar to the historical code snippets. For example, the amalgamation platform 102 may store a correlation between the historical execution scenarios and one or more code snippets used to generate the historical execution scenarios.

Additionally or alternatively, in some examples, the amalgamation platform 102 may configure and/or otherwise train the amalgamation engine to determine whether an execution scenario matches a malicious code execution scenario based on the historical execution scenarios and historical malicious code. For example, the amalgamation platform 102 may train the amalgamation engine to identify, flag, tag, and/or otherwise indicate that an execution scenario matches a malicious code execution scenario. In some instances, in training the amalgamation engine, the amalgamation platform 102 may identify a correlation between historical execution scenarios and historical malicious code. For example, the amalgamation platform 102 may identify that a historical execution scenario corresponds to one or more malicious code snippets included in the historical malicious code. Accordingly, the amalgamation platform 102 may train the amalgamation engine to maintain an indicator, algorithm, or the like indicating that the historical execution scenario is a historical malicious code execution scenario and causing the amalgamation engine to determine that execution scenarios similar to the historical execution scenario match a historical malicious code execution scenario. It should be noted that the above are merely a few example methods by which the amalgamation platform 102 may train the amalgamation engine and that the amalgamation platform 102 may additionally and/or alternatively configure and/or otherwise train the amalgamation engine based on additional parameters and/or training information without departing from the scope of this disclosure.

At step 203, the amalgamation platform 102 may establish a connection with the first enterprise user device 104. For example, the amalgamation platform 102 may establish a first wireless data connection with the first enterprise user device 104 to link the first enterprise user device 104 with the amalgamation platform 102 (e.g., in preparation for detecting code-passing, embedding code, and/or other functions). In some instances, the amalgamation platform 102 may identify whether or not a connection is already established with the first enterprise user device 104. If a connection is already established with the first enterprise user device 104, the amalgamation platform 102 might not re-establish the connection. If a connection is not yet established with the first enterprise user device 104, the amalgamation platform 102 may establish the first wireless data connection as described above.

At step 204, the amalgamation platform 102 may embed code. For example, the amalgamation platform 102 may use steganography to embed concealed code ("steganographic code") within existing base code such that the steganographic code is undetectable by users and/or devices (e.g., user devices such as first enterprise user device 104, and/or other devices). In some examples, the amalgamation platform 102 may embed the steganographic code in base code of a network (e.g., network 101, and/or other networks). For instance, the amalgamation platform 102 may embed steganographic code in base code of the network, such as source code of an application implemented by the network, in code corresponding to a device linked to the network (e.g., first enterprise user device 104, and/or other devices), code that is already embedded in data files transferred via the network, and/or other base code of the network. In embedding steganographic code, the amalgamation platform 102 may use one or more steganography functions, such as text steganography, least significant bit embedding, masking and filtering, cosine transformations, and/or other steganography functions. By embedding the steganographic code, the amalgamation platform 102 may configure one or more portions of the base code to be tracked/monitored by the amalgamation platform 102. For example, in embedding the steganographic code, the amalgamation platform 102 may embed the steganographic code in one or more particular code snippets the amalgamation platform 102 is configured to monitor. For instance, the amalgamation platform 102 may have built-in instructions and/or receive instructions from a user of the amalgamation platform 102 directing the amalgamation platform 102 to monitor particular code snippets. In these examples, the amalgamation platform 102 may embed the steganographic code in the particular code snippets.

Additionally or alternatively, in some instances, the amalgamation platform 102 may embed the steganographic code in one or more portions of the base code that are preconfigured to monitor the particular code snippets. For example, an application and/or device associated with the network may be configured to monitor particular code snippets (e.g., as part of a cybersecurity application, or the like). In these examples, the amalgamation platform 102 may embed the steganographic code of the application and/or device configured to monitor the particular source code snippets. In doing so, the amalgamation platform 102 may provide a redundant method for monitoring the particular code snippets that is concealed from users and/or devices associated with the network.

Figure 2B:
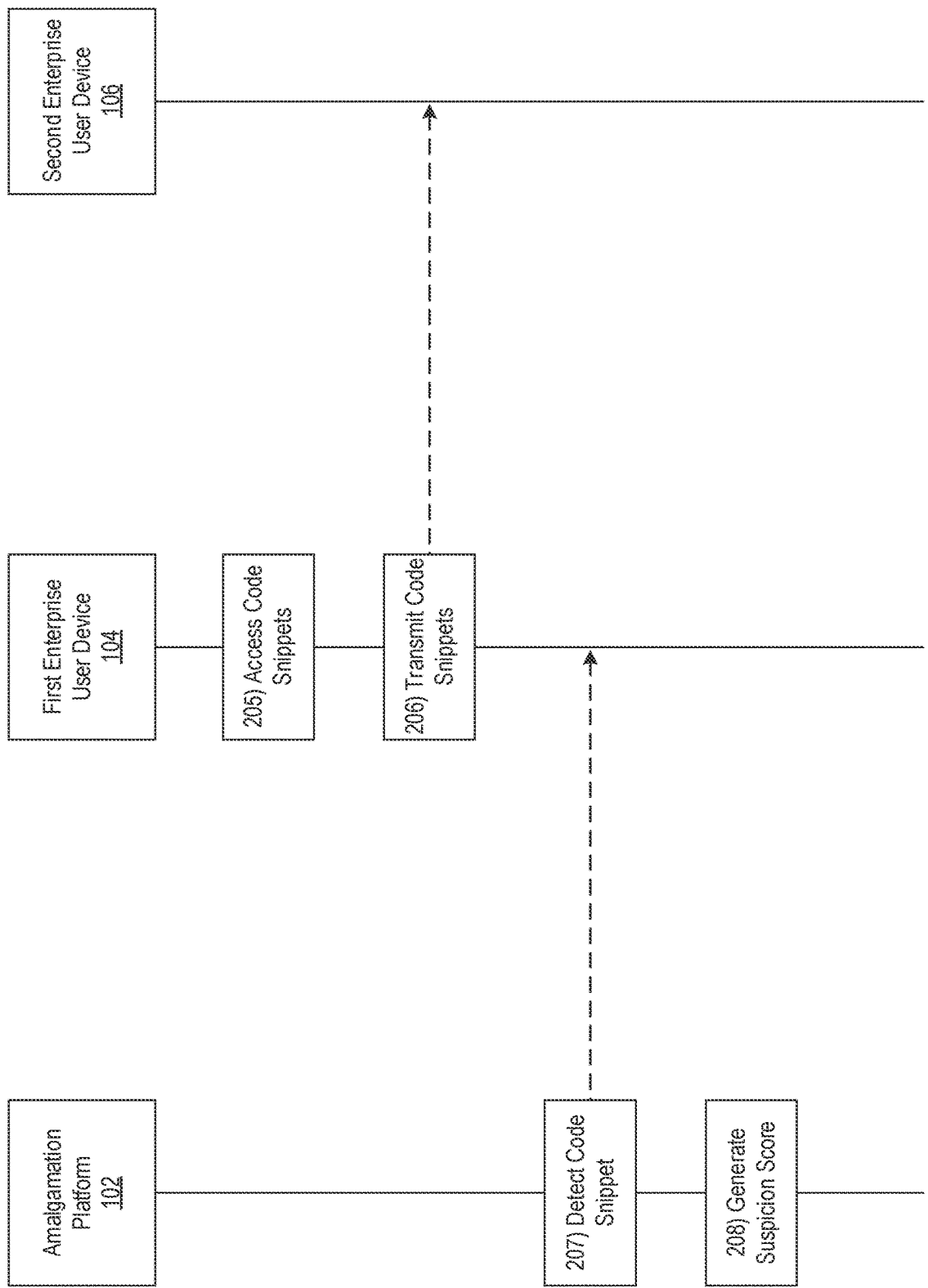

Referring to FIG. 2B, at step 205, the first enterprise user device 104 may access one or more code snippets. In some examples, the first enterprise user device 104 may access the code snippets after the amalgamation platform 102 has embedded steganographic code in the code snippets and/or after the amalgamation platform 102 has embedded steganographic code in portions of the base code configured to monitor the code snippets (e.g., as described above at step 204). The first enterprise user device 104 may access code snippets included in an application on the network, code snippets associated with a device linked to the network, code snippets included in one or more files on the network, and/or other code snippets. In accessing the code snippets, the first enterprise user device 104 may send a request (e.g., a GET request) for the code snippets and/or otherwise retrieve the code snippets from a storage location.

At step 206, based on accessing the code snippets, the first enterprise user device 104 may transmit the code snippets. In transmitting the code snippets, the first enterprise user device 104 may transmit the code snippets as part of an electronic file transfer, an email, and/or other methods of transmitting electronic information. In some examples, the first enterprise user device 104 may transmit the code snippets to one or more devices linked to the network 101 and associated with the enterprise organization corresponding to the first enterprise user device 104 (e.g., second enterprise user device 106, and/or other devices). Additionally or alternatively, in some instances, the first enterprise user device 104 may transmit the code snippets to one or more devices outside of the network 101 and unaffiliated with the enterprise organization. In these instances, the first enterprise user device 104 may route the code snippets, via the network 101, to a node and/or device configured to transmit messages (e.g., emails, or the like) to devices external from the network 101.

At step 207, based on or in response to the first enterprise user device 104 transmitting code snippets, the amalgamation platform 102 may detect a code snippet included in a transmission from the first enterprise user device 104. In some instances, the amalgamation platform 102 may detect the code snippet based on the steganographic code embedded in base code of the network (e.g., as described above at step 204). For example, in some instances the amalgamation platform 102 may have embedded, using steganography, steganographic code in a code snippet. The embedded steganographic code may configure the code snippet to be tracked/monitored by the amalgamation platform 102 (e.g., by including a secret message in the code snippet that is identifiable by the amalgamation platform 102, by including a hidden function in the code snippet that is triggered when the code snippet is transmitted, and/or by other means). Accordingly, based on the first enterprise user device 104 transmitting the code snippet, the amalgamation platform 102 may detect that the code snippet is included in the transmission from the first enterprise user device 104. Additionally or alternatively, in some examples, the amalgamation platform 102 may have embedded, using steganography, steganographic code in a portion of base code already configured to monitor/track the code snippet. For example, the network may include base code for an application configured to monitor the use of a set of data files, one of which might include the code snippet. The embedded steganographic code may add additional functionality to the application allowing for concealed tracking/monitoring of the data files and included code snippet. Accordingly, the amalgamation platform 102 may detect the code snippet included in a transmission from the first enterprise user device 104 even in situations where the transmission from the first enterprise user device 104 employs one or more methods of concealing itself from the traditional functions of the application. Although the above disclosure refers to a single code snippet, it should be understood that the functions described herein can be performed for one or more additional code snippets without departing from the scope of the disclosure.

At step 208, the amalgamation platform 102 may generate suspicion scores for code snippets. For example, the amalgamation platform 102 may generate a suspicion score for the code snippet detected at step 207 above. In some examples, the amalgamation platform 102 may generate the suspicion score for the code snippet by inputting the code snippet into the scoring engine. In generating the suspicion score, based on inputting the code snippet into the scoring engine, the amalgamation platform 102 may use one or more historical code snippets and/or historical suspicion scores (which may, e.g., have previously been used to train the scoring engine). In using the one or more historical code snippets and/or historical suspicion scores, the amalgamation platform 102 may cause the scoring engine to generate the suspicion score based on particular features of the code snippet. For example, the amalgamation platform 102 may cause the scoring engine to use one or more stored correlations between a particular device (e.g., first enterprise user device 104, and/or other devices), historical code snippets, and historical suspicion scores to generate the suspicion score for the code snippet. For instance, consider a scenario where the amalgamation platform 102 previously trained the scoring engine by storing a correlation between the first enterprise user device 104, a plurality of historical code snippets, and the plurality of historical suspicion scores corresponding to the plurality of historical code snippets. In such a scenario, the amalgamation platform 102 may cause the scoring engine to compare the code snippet detected at step 207 to each of the plurality of historical code snippets, based on the stored correlation to first enterprise user device 104. Based on the comparison, the scoring engine may identify a historical code snippet that is most similar (e.g., in function, and/or visually) to the code snippet. Accordingly, the amalgamation platform 102 may cause the scoring engine to generate a similarity score for the code snippet that matches or is similar to the historical suspicion score corresponding to the identified historical code snippet.

Additionally or alternatively, in some instances, in using the one or more historical code snippets and/or historical suspicion scores, the amalgamation platform 102 may cause the scoring engine to generate the suspicion score based on comparing the code snippet directly to historical code snippets. In some examples, the amalgamation platform 102 may cause the scoring engine to generate the suspicion score based on determining, by comparing the code snippet to historical code snippets, an amount by which logic of the code snippet has been changed. For instance, the amalgamation platform 102 may cause the scoring engine to compare the code snippet to historical code snippets to identify historical code snippets that included digital logic for performing a function associated with the code snippet.

For example, the code snippet may include a digital tag and/or other indication of an original function the code snippet was intended to perform when the code snippet is executed by a device and/or application of the network 101. In some instances, the digital logic of the code snippet may have been changed by the first enterprise user device 104 prior to and/or during transmission (e.g., to perform a malicious function, rather than the original function). Based on the comparison, the amalgamation platform 102 may cause the scoring engine to determine an amount by which the digital logic of code snippet differs from the digital logic of a historical code snippet that includes a digital tag and/or other indication of the same original function as the code snippet. In these instances, the amalgamation platform 102 may cause the scoring engine to generate a suspicion score based on the amount by which the digital logic of the code snippet differs from the historical code snippet and based on the historical suspicion score corresponding to the historical code snippet. For example, the amalgamation platform 102 may have previously trained the scoring engine to employ a suspicion algorithm to generate suspicion scores based on the amount by which the digital logic of the code snippet differs from the historical code snippet. For instance, the scoring engine may execute the suspicion algorithm using the following constraints/parameters:

$$\text{If}\left(\frac{\text{(amount of differing code)}}{\text{(total code snippet code)}}\right) \geq 0.5,$$

then: suspicion score =

$$\text{historical suspicion score} + \frac{\text{(amount of differing code)}}{\text{(total code snippet code)}}. \text{If else,}$$

then: suspicion score = historical suspicion score.

In this example, the scoring engine may execute the suspicion algorithm to determine whether, based on comparing the code snippet to a historical code snippet, the quotient of the amount of code in the code snippet that differs from the historical code snippet divided by the total amount of code in the historical code snippet meets or exceeds 50% (e.g., more than half of the code in the code snippet differs from the historical code snippet). Then, the scoring engine may generate a suspicion score equal to the sum of the historical suspicion score corresponding to the historical code snippet and the quotient of the amount of difference code divided by the total amount of code in the code snippet. For instance, if the historical suspicion score is 0.2, and the amount of differing code divided by the total amount of code in the code snippet is 0.5, the algorithm may generate a suspicion score of 0.7 for the code snippet. Else, the scoring engine may generate a suspicion score that is equivalent to the historical suspicion score corresponding to the historical code snippet. In some instances, the suspicion score generated by the scoring engine may be an integer value, a decimal value, a percentage, and/or other values. It should be understood that the above example is merely one algorithm the scoring engine may be trained to employ in order to generate the suspicion score and in one or more instances additional or alternative algorithms may be employed and/or may correspond to different parameters.

Figure 2C:
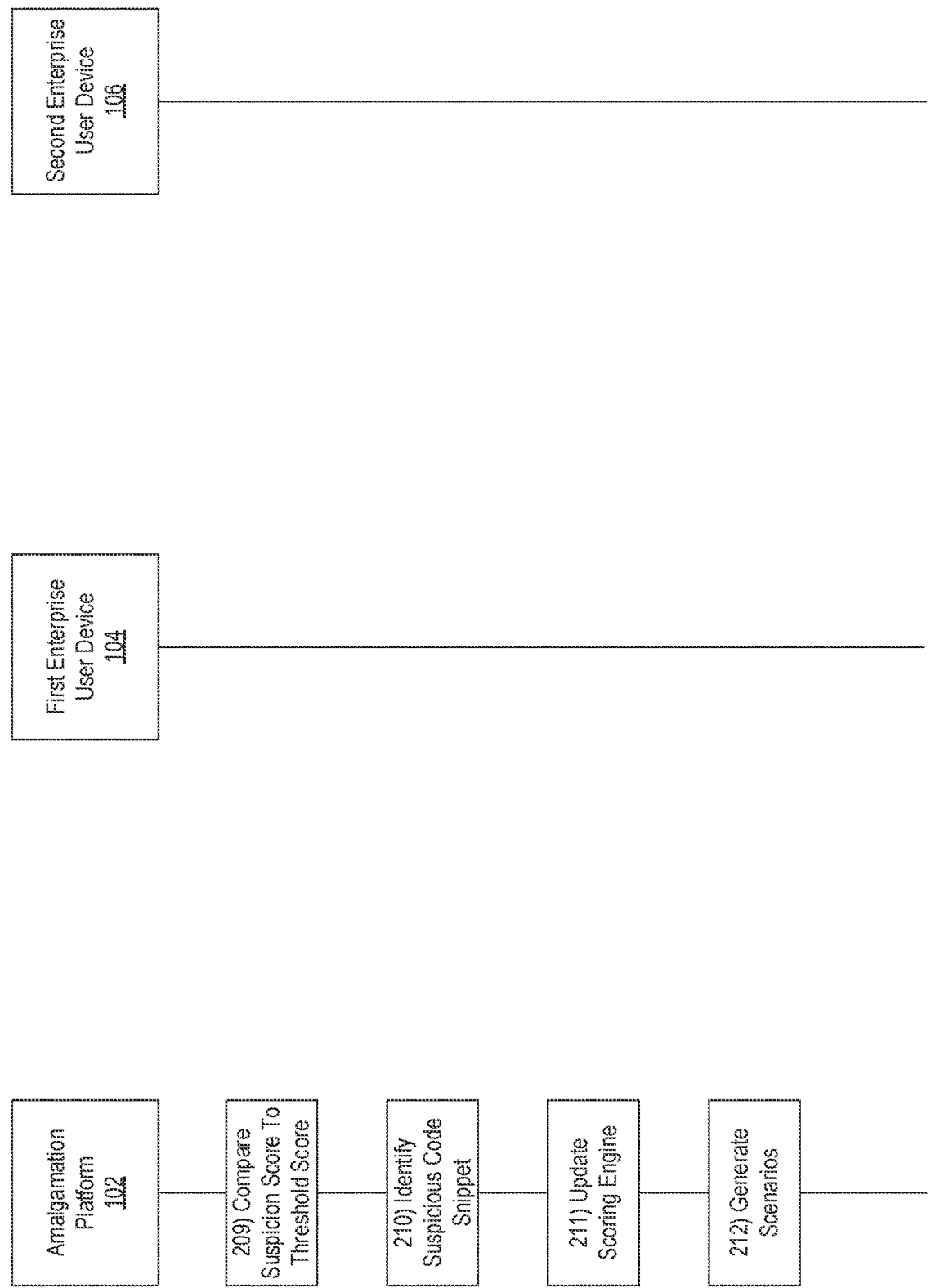

Referring to FIG. 2C, at step 209, the amalgamation platform 102 may compare the suspicion score to a threshold score. For example, the amalgamation platform 102 may compare the suspicion score to a threshold score in order to determine whether the code snippet should be identified as suspicious. The threshold score may be a value (e.g., an integer value, a percentage, a decimal value, and/or other values) that, when satisfied, indicates a code snippet should be identified as suspicious. Based on comparing the suspicion score to the threshold score, the amalgamation platform 102 may determine whether the suspicion score satisfies the threshold score. In some instances, based on determining that the suspicion score is less than the threshold score, the amalgamation platform 102 may determine that the suspicion score does not satisfy the threshold score. For example, based on comparing a suspicion score of 20% to a threshold score of 50%, the amalgamation platform 102 may determine that the suspicion score does not satisfy the threshold score. In other examples, based on determining that the suspicion score meets or exceeds the threshold score, the amalgamation platform 102 may determine that the suspicion score satisfies the threshold score. For instance, based on comparing a suspicion score of 80% to a threshold score of 50%, the amalgamation platform 102 may determine that the suspicion score does satisfy the threshold score.

In some instances, based on determining that the suspicion score does not satisfy the threshold score, the amalgamation platform 102 may return to detecting code snippets (e.g., as described above at step 207) without performing the functions described below. In some examples, based on determining that the suspicion score does satisfy the threshold score, the amalgamation platform 102 may proceed to identify the code snippet corresponding to the suspicion score as suspicious, as described below at step 210.

At step 210, based on or in response to determining that the suspicion score satisfies the threshold score, the amalgamation platform 102 may identify the code snippet corresponding to the suspicion score as suspicious. For example, the amalgamation platform 102 may embed a digital flag in the code snippet, store a record of the code snippet indicating the code snippet is suspicious, add the code snippet to a feed of suspicious code snippets maintained by the amalgamation platform 102, and/or otherwise identify the code snippet as suspicious.

At step 211, based on or in response to determining that the suspicion score satisfies the threshold score and/or based on identifying the code snippet as suspicious, the amalgamation platform 102 may refine, validate, and/or otherwise update the scoring engine. For example, the amalgamation platform 102 may update the scoring engine based on the suspicion score for the code snippet. In some instances, updating the scoring engine may include inputting the suspicion score and the code snippet into the scoring engine. By inputting the suspicion score and the code snippet into the scoring engine, the amalgamation platform 102 may create an iterative feedback loop that may continuously and dynamically refine the scoring engine to improve its accuracy. For example, based on inputting the suspicion score and the code snippet, the amalgamation platform 102 may cause the scoring engine to store one or more correlations between the suspicion score and the code snippet. For instance, the amalgamation platform 102 may cause the scoring engine to store a correlation indicating that code snippets which include a feature of the code snippet detected at step 207, (e.g., an indication of a device associated with the code snippet, such as an indication that the code snippet was transmitted by the particular device, an indication that the code snippet was included in code stored on the particular device, and/or other indications that the code snippet is associated with the particular device) should cause the scoring engine to generate a similar suspicion score to the suspicion score generated at step 208, when inputted into the scoring engine (e.g., in future iterations of the functions described herein). Based on storing the correlation, the amalgamation platform 102 may refine, validate, and/or otherwise update the scoring engine to generate suspicion scores based on, in some instances, the stored correlation. For example, the amalgamation platform 102 may update the scoring engine to generate suspicion scores similar to the input suspicion score based on input of code snippets similar to the input code snippet in future iterations of the feedback loop.

In updating the scoring engine, the amalgamation platform 102 may improve the accuracy and success rate of the suspicion score generation processes, which may, e.g., result in more efficient training of machine learning models trained by the amalgamation platform 102 (and may in some instances, conserve computing and/or processing power/resources in doing so). The amalgamation platform 102 may further prevent code snippets that are transmitted as part of a valid transmittal from being identified as suspicious in future iterations of the feedback loop, based on updating the scoring engine.

At step 212, the amalgamation platform 102 may generate one or more scenarios. For example, the amalgamation platform 102 may generate one or more execution scenarios representing simulations of executing a code snippet (e.g., the code snippet identified as a suspicious code snippet above at step 210). In some instances, the amalgamation platform 102 may generate the one or more execution scenarios by inputting the code snippet into the amalgamation engine. In generating the one or more execution scenarios, based on inputting the code snippet into the amalgamation engine, the amalgamation platform 102 may generate one or more test functions based on test code snippets. In some examples, the test code snippets may be and/or include historical code snippets included in the training set of historical execution scenarios used to train the amalgamation engine. Additionally or alternatively, in some instances, the test code snippets may be code snippets supplied by a user of the amalgamation platform 102 after training the amalgamation engine. Each test code snippet may be and/or include code that is configured to cause execution of a function or portion of a function when the test code snippet is executed by a device and/or application.

In some instances, the amalgamation engine may combine the test code snippets and the code snippet into one or more test functions. In some examples, in generating the one or more test functions, the amalgamation engine may generate a test function for each potential combination of the code snippet and one or more test code snippets. In some instances, the amalgamation engine may only generate a test function for a predetermined number/limit of potential combinations of the code snippet and one or more test code snippets. Each test function may be any function capable of being executed by a device and/or application on a network (e.g., installing an application on the network, granting a device access to the network, preventing a device from accessing the network, accessing information on the network, and/or other functions).

In some examples, based on generating the one or more test functions, the amalgamation platform 102 may cause the amalgamation engine to simulate execution of the one or more test functions. For example, the amalgamation platform 102 may cause the amalgamation engine to simulate, for teach test function generated by the amalgamation engine, the effects of executing the combined code snippet and test code snippets by a device and/or application on the network (e.g., network 101, or the like). In some instances, in order to simulate execution of the one or more test functions, the amalgamation engine may generate a digital twin of the network (e.g., network 101). For example, the amalgamation engine may, based on a wireless data connection between the amalgamation platform 102 and the network 101, generate a digital representation of each device and application included in the network 101 and their respective connections. In some examples, based on generating the digital twin, the amalgamation platform 102 may cause the amalgamation engine to simulate the effects of executing the test functions on the network using the digital twin. For instance, the amalgamation engine may generate a report, heat map, diagnostic, and/or other indications of the simulated effects of executing the test functions via the digital twin.

In some instances, in order to simulate the effects of executing the test functions, with or without the digital twin, the amalgamation platform 102 may cause the amalgamation engine to modify an internal clock of the amalgamation engine. For example, while simulating the effects of executing the test functions, the amalgamation platform 102 may cause the amalgamation engine to modify the internal clock of the amalgamation engine to simulate the effects of executing the test functions over a particular period of time (e.g., a day, a week, a month, a year, or the like). In simulating the effects of executing the test functions over a particular period of time, the amalgamation platform 102 may, via the amalgamation engine, determine what the results of executing the one or more test functions are after the period of time expires.

It should be understood that the above disclosure merely provides some examples methods for generating one or more execution scenarios using the amalgamation engine and that in some instances one or more additional methods and/or parameters may be used by the amalgamation engine without departing from the scope of this disclosure. For instance, the amalgamation platform 102 may cause the amalgamation engine to use one or more additional or alternative methods of generating execution scenarios to generate a report, diagnostic, heat map, and/or other indications of the simulated effects of executing the test functions using devices and/or applications on the network.

Figure 2D:
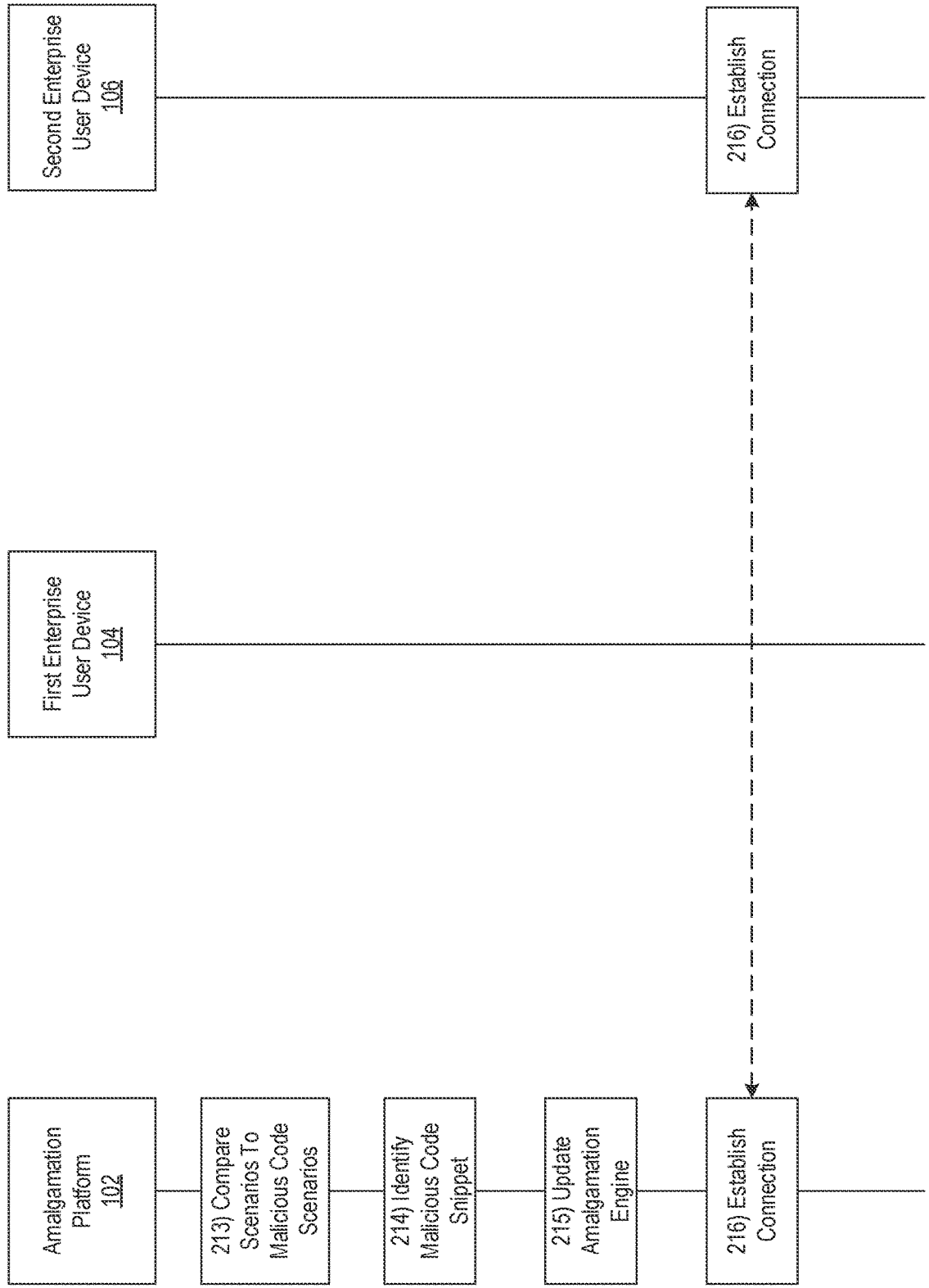

Referring to FIG. 2D, at step 213, the amalgamation platform 102 may compare one or more scenarios (e.g., the one or more execution scenarios generated by the amalgamation engine) to one or more malicious code scenarios. The one or more malicious code scenarios may be and/or include simulations of executing known malicious code using devices and/or applications of the network 101. In some examples, the one or more malicious code scenarios may have previously been generated by the amalgamation engine by performing the functions described above at step 212 with known malicious code. In some instances, the amalgamation platform 102 may compare one or more execution scenarios to the one or more malicious code scenarios using the amalgamation engine. For example, the amalgamation platform 102 may cause the amalgamation engine to compare, from the one or more execution scenarios, the effects of executing the test functions to the effects of executing malicious code in the one or more malicious code scenarios. In some instances, the amalgamation platform 102 may cause the amalgamation engine to compare the one or more execution scenarios to the one or more malicious code scenarios at a given point in time. Additionally or alternatively, the amalgamation platform 102 may cause the amalgamation engine to compare the execution scenarios to the malicious code scenarios over a period of time (e.g., based on accelerating the internal clock utilized by the amalgamation engine).

In some examples, based on comparing execution scenarios to malicious code scenarios, the amalgamation platform 102 may cause the amalgamation engine to determine a match between an execution scenario and a malicious code scenario. For example, the amalgamation engine may determine that some or all of the simulated effects of the execution scenario match some or all of the effects of the malicious code scenario. For instance, based on comparing the execution scenario and the malicious code scenario and determining that both scenarios cause a particular effect (e.g., installing an application on the network, granting a device access to the network, preventing a device from accessing the network, accessing information on the network, and/or other effects), the amalgamation engine may determine that the execution scenario and the malicious code scenario are a match.

Additionally or alternatively, in some instances, the amalgamation platform 102 may cause the amalgamation engine to determine, based on comparing the execution scenario to the malicious code scenario, that the similarity between the execution scenario and the malicious code scenario satisfies a threshold similarity value. In determining that the similarity between an execution scenario and a malicious code scenario satisfies a threshold similarity value, the amalgamation platform 102 may cause the amalgamation engine to generate a similarity score between the execution scenario and the malicious code scenario based on comparing the scenarios. In some instances, the similarity score may be based on identifying similarities between the execution scenario and the malicious code scenario based on parameters such as a number of devices or applications affected, particular devices or applications affected, information accessed, CPU (central processing unit) usage, RAM (random access memory) usage, access permissions affected, and/or other parameters related to executing the execution scenario and malicious code scenario. In some examples, the amalgamation platform 102 may have previously trained the amalgamation engine to employ a similarity algorithm to generate similarity scores based on the identified similarities between the execution scenario and the malicious code scenario. For instance, the amalgamation engine may execute the similarity algorithm using the following constraints/parameters:

If($|(CPU$ Usage in Execution Scenario $- CPU$ Usage in Malicious

Code Scenario)$|$ + (Devices Affected in Execution

Scenario $-$ Devices Affected in Malicoius Code

Scenario)$|) \leq 0.2$, then: similarity score $= 1$.If else, then: similarity score $= 0$.

In this example, the amalgamation engine may execute the similarity algorithm to determine whether, based on comparing the execution scenario to the malicious code scenario, the absolute values of the difference between CPU usage and the difference in number of devices affected sum to an amount less than a threshold/tolerance value (e.g., 0.2, or any other value). If the sum described above is less than or equal to the threshold/tolerance value, the amalgamation engine may determine that the similarity score between the execution scenario and the malicious code scenario is one, indicating that there is a match between the execution scenario and the malicious code scenario. Else, the amalgamation engine may generate a similarity score of zero, indicating that there is not a match between the execution scenario and the malicious code scenario. In some instances, the similarity score generated by the amalgamation engine may be an integer value, a decimal value, a percentage, and/or other values. In some examples, the amalgamation engine may compare the similarity score to a threshold value to determine whether the similarity score satisfies the threshold value. For instance, in the above example scenario, the threshold value may be one and may be satisfied by similarity scores that meet the threshold value. Accordingly, a similarity score of one would satisfy the threshold, indicating a match between the execution scenario and the malicious code scenario, while a similarity score of zero would not satisfy the threshold, indicating there is no match between the execution scenario and the malicious code scenario.

It should be understood that the above example is merely one algorithm the amalgamation engine may be trained to employ in order to generate the similarity score and in one or more instances additional or alternative algorithms may be employed and/or may correspond to different parameters. Furthermore, while the comparison of one execution scenario to one malicious code scenario is described above, it should be understood that in some examples the amalgamation platform 102 may cause the amalgamation engine to compare each of the one or more execution scenarios to each of the malicious code scenarios to determine matches. In these examples, the amalgamation platform 102 may determine a plurality of matches between execution scenarios and malicious code scenarios.

In some instances, the amalgamation platform 102 may, after comparing each execution scenario to each malicious code scenario, determine that there are no matches. In these instances, the amalgamation platform 102 may continue to detect transmitted code snippets as described above at step 207 and may not perform the functions of the remaining steps described below. In some examples, based on or in response to determining at least one match between an execution scenario and a malicious code scenario, the amalgamation platform 102 may proceed to identify a malicious code snippet (e.g., as described below at step 214).

At step 214, the amalgamation platform 102 may, based on or in response to determining a match between an execution scenario and a malicious code scenario, identify the code snippet used to generate the execution scenarios as a malicious code snippet. For example, the amalgamation platform 102 may embed a digital flag in the code snippet, store a record of the code snippet indicating the code snippet is malicious, add the code snippet to a feed of malicious code snippets maintained by the amalgamation platform 102, and/or otherwise identify the code snippet as malicious.

At step 215, based on or in response to identifying that the code snippet is malicious, the amalgamation platform 102 may refine, validate, and/or otherwise update the amalgamation engine. For example, the amalgamation platform 102 may update the amalgamation engine based on the execution scenario (or scenarios) for which a match to a malicious code scenario was determined. In some instances, updating the amalgamation engine may include inputting the execution scenario into the amalgamation engine. By inputting the execution scenario into the amalgamation engine, the amalgamation platform 102 may create an iterative feedback loop that may continuously and dynamically refine the amalgamation engine to improve its accuracy. For example, based on inputting the execution scenario, the amalgamation platform 102 may cause the amalgamation engine to store the execution scenario as an additional malicious code scenario for future iterations of the feedback loop. Based on storing the execution scenario as a malicious code scenario, the amalgamation platform 102 may refine, validate, and/or otherwise update the amalgamation engine to determine matches between additional execution scenarios and the execution scenario stored as a malicious code scenario.

In updating the amalgamation engine, the amalgamation platform 102 may improve the accuracy and sample size for determining matches between execution scenarios and malicious code scenarios, which may, e.g., result in more efficient training of machine learning models trained by the amalgamation platform 102 (and may in some instances, conserve computing and/or processing power/resources in doing so). The amalgamation platform 102 may further prevent code snippets that are transmitted as part of a valid transmittal from being identified as malicious in future iterations of the feedback loop, based on updating the amalgamation engine.

At step 216, based on or in response to identifying the code snippet as malicious and/or based on or in response to updating the amalgamation engine, the amalgamation platform 102 may establish a connection with the second enterprise user device 106. For example, the amalgamation platform 102 may establish a second wireless data connection with the second enterprise user device 106 to link the second enterprise user device 106 with the amalgamation platform 102 (e.g., in preparation for initiating a security action, causing display of an interface, and/or other functions). In some instances, the amalgamation platform 102 may identify whether or not a connection is already established with the second enterprise user device 106. If a connection is already established with the second enterprise user device 106, the amalgamation platform 102 might not re-establish the connection. If a connection is not yet established with the second enterprise user device 106, the amalgamation platform 102 may establish the second wireless data connection as described above.

Referring to FIG. 2E, at step 217, the amalgamation platform 102 may initiate one or more security actions. For example, the amalgamation platform 102 may initiate one or more security actions for preventing and/or responding to the transmittal of malicious code snippets. The security actions may be and/or include causing display of an alert at a security device (e.g., an enterprise device configured to perform additional security actions, such as second enterprise user device 106, and/or other devices), generating a security report indicating the code snippet is malicious, blocking, via network 101, one or more transmissions of the code snippet from reaching its destination, updating one or more security protocols of the network, disconnecting a device (e.g., first enterprise user device 104, and/or other devices) that transmitted the code snippet from the network, and/or other security actions. In some examples, in disconnecting the device that transmitted the code snippet from the network, the amalgamation platform 102 may sever first enterprise user device 104's connection to network 101 and/or add information corresponding to the first enterprise user device 104 (e.g., an IP address, or the like) to a watchlist to prevent future access to the network 101.

Figure 3:
FIG. 3 depicts an illustrative graphical user interface depicting an actionable alert interface generated as part of providing concealed detection of code-passing using steganography in accordance with one or more example arrangements.

Additionally or alternatively, in some instances, in initiating the one or more security actions, the amalgamation platform 102 may cause display of a user interface at a security device (e.g., second enterprise user device 106, and/or other devices). For example, in causing display of the user interface, the amalgamation platform 102 may transmit and cause display of an actionable alert interface. In displaying the actionable alert interface, the amalgamation platform 102 may display a graphical user interface similar to actionable alert interface 300, which is illustrated in FIG. 3. Referring to FIG. 3, in some instances, the actionable alert interface 300 may include information corresponding to the malicious code snippet. For example, the actionable alert interface 300 may include information such as a notification that a malicious code snippet has been transmitted, an indication of the steganographic code used to detect transmittal of the malicious code snippet, a summary of the execution scenario (i.e., the malicious execution scenario) associated with the malicious code snippet, a summary of the security actions initiated by the amalgamation platform 102, and/or other information. The actionable alert interface 300 may also display interface elements or selectable options requesting user input. For example, the actionable alert interface 300 may display one or more of: an information entry field, a button or buttons, toggle or toggles, check box or boxes, and/or other interface elements. For example, as illustrated in FIG. 3, the interface elements may be one or more buttons the user might toggle to perform an additional security action, such as disconnecting the device (e.g., first enterprise user device 104, or the like) from the network 101. In some instances, based on user input requesting that the transmitting device be disconnected, the amalgamation platform 102 may disconnect the first enterprise user device 104 from the network as described above at step 216.

Figure 4:
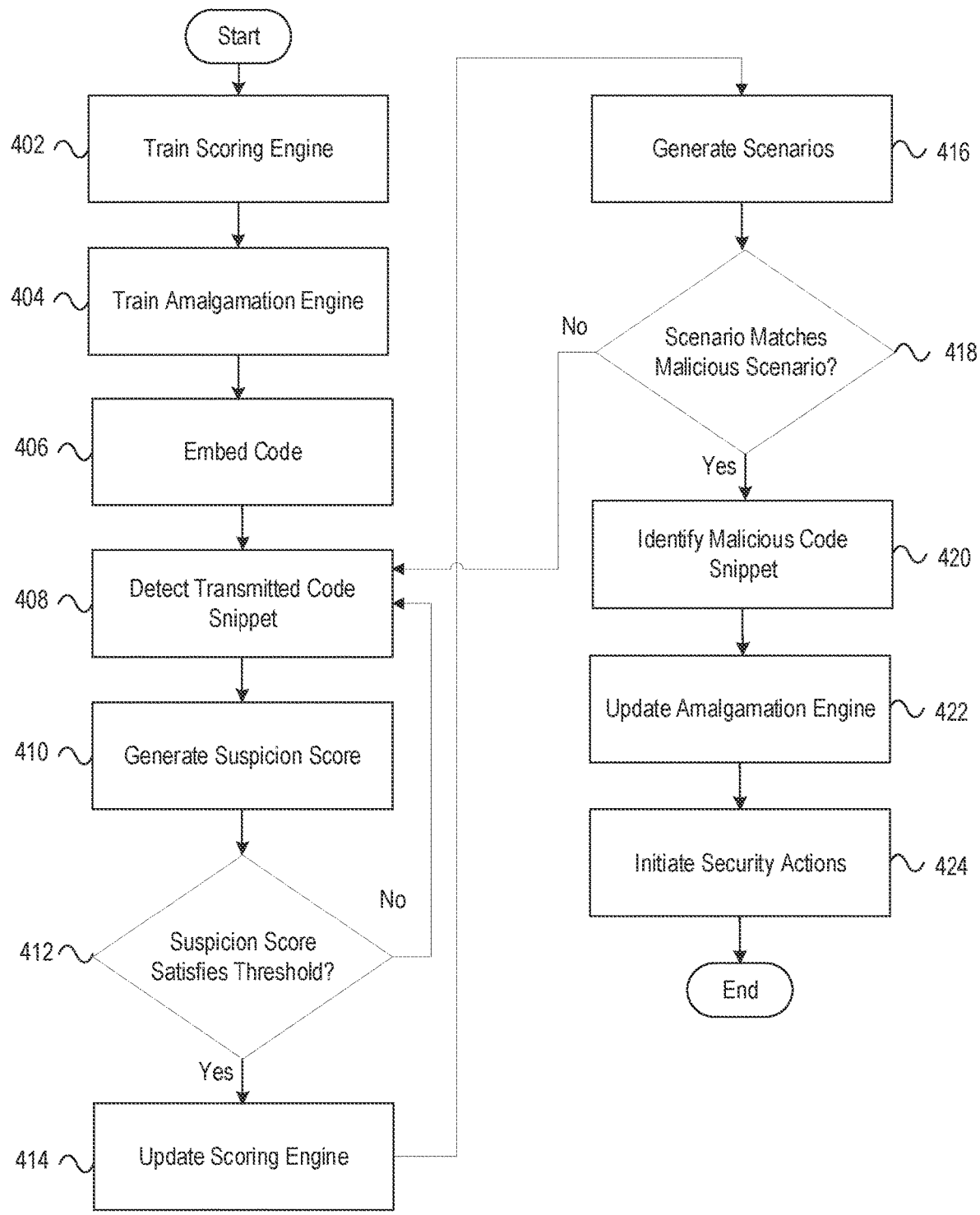
FIG. 4 depicts an illustrative method for an amalgamation platform providing concealed detection of code-passing using steganography in accordance with one or more example arrangements.

FIG. 4 depicts an illustrative method for using an amalgamation platform to provide concealed detection of code-passing using steganography in accordance with one or more example arrangements. Referring to FIG. 4, at step 402, a computing platform having at least one processor, a communication interface, and memory may train a scoring engine. For example, the computing platform may train a scoring engine to generate suspicion scores for code snippets based on input of code snippets. At step 404, the computing platform may train an amalgamation engine. For example, the computing platform may train an amalgamation engine to generate execution scenarios for code snippets based on input of code snippets and/or to determine matches between execution scenarios and malicious code scenarios. At step 406, the computing platform may embed code in a network. For example, the computing platform may embed code using steganography. At step 408, the computing platform may detect a transmitted code snippet using steganographic code. At step 410, the computing platform may generate a suspicion score for the detected code snippet. At step 412, the computing platform may determine whether the suspicion score satisfies a threshold score. Based on determining that the suspicion score does not satisfy the threshold score, the computing platform may return to step 408 and detect additional transmitted code snippets. Based on determining that the suspicion score does satisfy the threshold score, the computing platform may proceed to step 414 and update the scoring engine.

At step 414, the computing platform may update the scoring engine based on the code snippet and corresponding suspicion score. At step 416, the computing platform may generate scenarios, such as execution scenarios, simulating execution of the code snippet. At step 418, the computing platform may determine whether an execution scenario matches a malicious code scenario. Based on determining that no execution scenarios match a malicious code scenario, the computing platform may return to step 408 and detect additional code snippets. Based on determining at least one execution scenario matches a malicious code scenario, the computing platform may proceed to step 420 and identify the code snippet corresponding to the execution scenario as malicious. At step 422, the computing platform may update the amalgamation engine based on the malicious code snippet and the corresponding execution scenario. At step 424, the computing platform may initiate one or more security actions.

One or more aspects of the disclosure may be embodied in computer-usable data or computer-executable instructions, such as in one or more program modules, executed by one or more computers or other platforms to perform the operations described herein. Generally, program modules include routines, programs, objects, components, data structures, and the like that perform particular operations or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like.

The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   train an amalgamation engine based on a training set of historical malicious code and historical execution scenarios, wherein training the amalgamation engine configures the amalgamation engine to generate, based on input of code snippets, execution scenarios for the code snippets;
   embed steganographic code in base code of a network, wherein the steganographic code configures one or more portions of the base code to be tracked;
   detect, based on the steganographic code, a code snippet of the base code, wherein the code snippet is included in transmissions via the network;
   generate a suspicion score for the code snippet, wherein the suspicion score corresponds to an amount by which logic of the code snippet has been changed;
   determine, by comparing the suspicion score to a threshold score, whether the suspicion score satisfies the threshold score;
   generate, based on determining the suspicion score satisfies the threshold score and by inputting the code snippet into the amalgamation engine, one or more execution scenarios, wherein generating the one or more execution scenarios comprises:
     generating, by combining the code snippet with a plurality of test code snippets, one or more test functions; and
     simulating, using the amalgamation engine, execution of the one or more test functions;
   determine, by comparing the one or more execution scenarios to one or more historical malicious code scenarios using the amalgamation engine, a match between a first execution scenario and a first malicious code scenario;
   identify, based on the match, the code snippet as a malicious code snippet;
   update, based on the malicious code snippet, the amalgamation engine; and
   initiate, based on identifying the malicious code snippet, one or more security actions.

2. The computing platform of claim 1, wherein the memory stores one or more additional computer-readable instructions that, when executed by the at least one processor, cause the computing platform to:
   train a scoring engine based on a training set of historical code snippets and a training set of historical suspicion scores corresponding to the training set of historical code snippets, wherein training the scoring engine configures the scoring engine to output suspicion scores based on input of code snippets,
   wherein generating the suspicion score comprises inputting the code snippet into the scoring engine; and
   update, based on determining the suspicion score satisfies the threshold score, the scoring engine.

3. The computing platform of claim 1, wherein the base code of the network comprises one or more of:
   source code of an application implemented by the network,
   code corresponding to a device linked to the network, or
   code embedded in data files transferred via the network.

4. The computing platform of claim 1, wherein the transmissions via the network comprise transmissions from a device linked to the network to one or more devices outside the network.

5. The computing platform of claim 1, wherein the steganographic code is embedded in the code snippet.

6. The computing platform of claim 1, wherein the steganographic code is embedded in a first portion of the base code configured to monitor a second portion of the base code comprising the code snippet.

7. The computing platform of claim 1, wherein simulating execution of the one or more test functions comprises:
   simulating, via a digital twin of the network, execution of the one or more test functions on the network;
   modifying, while simulating execution of the one or more test functions on the network, a clock of the amalgamation engine by a period of time; and
   determining, based on modifying the clock of the amalgamation engine, a result of executing the one or more test functions after the period of time expires.

8. The computing platform of claim 1, wherein determining the match is based on determining the first execution scenario and the first malicious code scenario correspond to a same effect of executing code corresponding to each respective execution scenario.

9. The computing platform of claim 1, wherein determining the match is based on:
   generating, using the amalgamation engine and based on the match, a similarity score for the first execution scenario, wherein the similarity score indicates a similarity between the first execution scenario and the first malicious code scenario; and
   comparing the similarity score to a second threshold score; and
   determining, based on comparing the similarity score to the second threshold score, whether the similarity score satisfies the second threshold score.

10. The computing platform of claim 1, wherein the one or more security actions comprise one or more of:
    causing, at a security device, display of an alert,
    generating a security report indicating the code snippet is malicious,
    blocking one or more transmissions of the code snippet,
    updating one or more security protocols of the network, or
    disconnecting, from the network, a user device that transmitted the code snippet.

11. A method comprising:
    at a computing device comprising at least one processor, a communication interface, and memory:
      training an amalgamation engine based on a training set of historical malicious code and historical execution scenarios, wherein training the amalgamation engine configures the amalgamation engine to generate, based on input of code snippets, execution scenarios for the code snippets;
      embedding steganographic code in base code of a network, wherein the steganographic code configures one or more portions of the base code to be tracked;
      detecting, based on the steganographic code, a code snippet of the base code, wherein the code snippet is included in transmissions via the network;
      generating a suspicion score for the code snippet, wherein the suspicion score corresponds to an amount by which logic of the code snippet has been changed;
      determining, by comparing the suspicion score to a threshold score, whether the suspicion score satisfies the threshold score;
      generating, based on determining the suspicion score satisfies the threshold score and by inputting the code snippet into the amalgamation engine, one or more execution scenarios, wherein generating the one or more execution scenarios comprises:
        generating, by combining the code snippet with a plurality of test code snippets, one or more test functions; and
        simulating, using the amalgamation engine, execution of the one or more test functions;
      determining, by comparing the one or more execution scenarios to one or more historical malicious code scenarios using the amalgamation engine, a match between a first execution scenario and a first malicious code scenario;
      identifying, based on the match, the code snippet as a malicious code snippet;
      updating, based on the malicious code snippet, the amalgamation engine; and
      initiating, based on identifying the malicious code snippet, one or more security actions.

12. The method of claim 11, further comprising:
    training a scoring engine based on a training set of historical code snippets and a training set of historical suspicion scores corresponding to the training set of historical code snippets, wherein training the scoring engine configures the scoring engine to output, based on input of code snippets, suspicion scores, and
    wherein generating the suspicion score comprises inputting the code snippet into the scoring engine; and
    updating, based on determining the suspicion score satisfies the threshold score, the scoring engine.

13. The method of claim 11, wherein simulating execution of the one or more test functions comprises:
    simulating, via a digital twin of the network, execution of the one or more test functions on the network;
    modifying, while simulating execution of the one or more test functions on the network, a clock of the amalgamation engine by a period of time; and
    determining, based on modifying the clock of the amalgamation engine, a result of executing the one or more test functions after the period of time expires.

14. The method of claim 11, wherein determining the match is based on determining that the first execution scenario and the first malicious code scenario correspond to a same effect of executing code corresponding to each respective execution scenario.

15. The method of claim 11, wherein determining the match is based on:
    generating, using the amalgamation engine and based on the match, a similarity score for the first execution scenario, wherein the similarity score indicates a similarity between the first execution scenario and the first malicious code scenario; and
    comparing the similarity score to a second threshold score; and
    determining, based on comparing the similarity score to the second threshold score, whether the similarity score satisfies the second threshold score.

16. One or more non-transitory computer-readable media storing instructions that, when executed by a computing platform comprising at least one processor, a communication interface, and memory, cause the computing platform to:
    train an amalgamation engine based on a training set of historical malicious code and historical execution scenarios, wherein training the amalgamation engine configures the amalgamation engine to generate, based on input of code snippets, execution scenarios for the code snippets;

embed steganographic code in base code of a network, wherein the steganographic code configures one or more portions of the base code to be tracked;

detect, based on the steganographic code, a code snippet of the base code, wherein the code snippet is included in transmissions via the network;

generate a suspicion score for the code snippet, wherein the suspicion score corresponds to an amount by which logic of the code snippet has been changed;

determine, by comparing the suspicion score to a threshold score, whether the suspicion score satisfies the threshold score;

generate, based on determining the suspicion score satisfies the threshold score and by inputting the code snippet into the amalgamation engine, one or more execution scenarios, wherein generating the one or more execution scenarios comprises:

generating, by combining the code snippet with a plurality of test code snippets, one or more test functions; and simulating, using the amalgamation engine, execution of the one or more test functions;

determine, by comparing the one or more execution scenarios to one or more historical malicious code scenarios using the amalgamation engine, a match between a first execution scenario and a first malicious code scenario;

identify, based on the match, the code snippet as a malicious code snippet;

update, based on the malicious code snippet, the amalgamation engine; and initiate, based on identifying the malicious code snippet, one or more security actions.

17. The one or more non-transitory computer-readable media of claim 16, storing instructions that, when executed, further cause the computing platform to:

train a scoring engine based on a training set of historical code snippets and a training set of historical suspicion scores corresponding to the training set of historical code snippets, wherein training the scoring engine configures the scoring engine to output, based on input of code snippets, suspicion scores, and wherein generating the suspicion score comprises inputting the code snippet into the scoring engine; and update, based on determining the suspicion score satisfies the threshold score, the scoring engine.

18. The one or more non-transitory computer-readable media of claim 16, wherein simulating execution of the one or more test functions comprises:

simulating, via a digital twin of the network, execution of the one or more test functions on the network;

modifying, while simulating execution of the one or more test functions on the network, a clock of the amalgamation engine by a period of time; and determining, based on modifying the clock of the amalgamation engine, a result of executing the one or more test functions after the period of time expires.

19. The one or more non-transitory computer-readable media of claim 16, wherein determining the match is based on determining that the first execution scenario and the first malicious code scenario correspond to a same effect of executing code corresponding to each respective execution scenario.

20. The one or more non-transitory computer-readable media of claim 16, wherein determining the match is based on:

generating, using the amalgamation engine and based on the match, a similarity score for the first execution scenario, wherein the similarity score indicates a similarity between the first execution scenario and the first malicious code scenario; and comparing the similarity score to a second threshold score; and determining, based on comparing the similarity score to the second threshold score, whether the similarity score satisfies the second threshold score.

* * * * *